United States Patent Office 2,963,492
Patented Dec. 6, 1960

2,963,492

12α-HALO-11-OXYGENATED PROGESTERONES

Josef Fried and Josef E. Herz, New Brunswick, N.J., assignors to Olin Mathieson Chemical Corporation, New York, N.Y., a corporation of Virginia No Drawing. Filed Nov. 8, 1955, Ser. No. 545,795

3 Claims. (Cl. 260—397.3)

This application is a continuation-in-part of our parent application, Serial No. 519,682, filed July 1, 1955.

This invention relates to the synthesis of valuable steroids; and has for its objects the provision of certain steroids useful themselves as physiologically active steroids.

The compounds of this invention comprise the physiologically active 12α-fluoro (or chloro)-11β-hydroxy (or 11-keto)-progesterone.

To prepare these compounds, 11-dehydroprogesterone is reacted with a hydroxybrominating agent, preferably an N-bromamide of a lower alkanoic acid (e.g. N-bromacetamide), an N-bromimide of a lower alkanedioic acid (e.g. N-bromosuccinimide), or dibromodimethylhydantoin in the presence of water. The reaction is optimally carried out in the presence of a strong acid (e.g. perchloric acid or sulfuric acid), whereby the desired brominated product is formed to the exclusion of undesired by-products. This reaction can be conducted at any normal temperature (e.g. ambient temperature) under normal pressure (e.g. ambient pressure).

The reaction results in the production of 12α-bromo-11β-hydroxyprogesterone, which can then be dehydrobrominated by interaction with a basic reagent, such as an alkali metal salt of a weak organic acid (e.g. an alkali metal acetate or carbonate) or an alkali metal hydroxide (e.g. potassium hydroxide), in a suitable organic solvent, such as alcohols, lower alkanoic acids, or ketones (preferably in lower alkanol such as methanol or ethanol) to form 11β,12β-epoxyprogesterone.

11β,12β-epoxyprogesterone is then reacted with a hydrogen halide (i.e. hydrofluoric and hydrochloric acid) in a suitable solvent, such as a halogenated alkane (e.g. chloroform), an alcohol (e.g. methanol), or an ether (e.g. dioxane). By this reaction, 12α-halo-11β-hydroxyprogesterones are formed, wherein the 12α-halo substituent corresponds to the halide of the hydrohalic acid used in the reaction.

The 12α-halo-11β-hydroxyprogesterones can be oxidized, if desired, to the corresponding 12α-halo-11-ketoprogesterones in the usual manner, as by treatment with a hexavalent chromium compound (e.g. chromic acid).

The 12α-halo-11β-hydroxy (or 11-keto)-progesterones of this invention, having the general formula

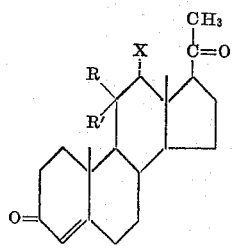

wherein R is hydrogen, R' is β-hydroxy, or together R and R' is keto, and X is fluoro or chloro, are physiologically active steroids which possess glucocorticoid as well as mineralocorticoid activity. Thus, these new steroids of this invention can be administered instead of, and in the same manner as, cortisone or hydrocortisone in the treatment of rheumatoid arthritis and dermatomyositis, or in the same manner as desoxycorticosterone in the treatment of Addison's disease or adrenal insufficiencies. The dosage for such administration is, of course, dependent on the relative activity of the compound; thus, where the steroid derivative has approximately the same activity as cortisone, the dosage of the former to be employed should be approximately equal to the employed dosage of the latter.

The following examples are illustrative of the invention (all temperatures being in centigrade):

EXAMPLE 1

*12α-bromo-11β-hydroxyprogesterone from 11-dehydroprogesterone*

To a solution of 900 mg. of 11-dehydroprogesterone in 90 ml. of dioxane is added 54 ml. of 0.16 N-perchloric acid and 540 mg. of N-bromoacetamide. After 20 minutes at room temperature, dilute sodium sulfite solution is added to destroy excess N-bromoacetamide and 100 ml. of chloroform is added. After separation of the layers, the chloroform-dioxane phase is washed with water, dilute sodium bicarbonate and again with water and the solvents removed in vacuo at 20°. The residue (about 1.262 g.) crystallizes readily from acetone-hexane yielding crude 12α-bromo-11β-hydroxyprogesterone melting at about 210–220°, which is used in the procedure of Example 3 without further purification. The pure material is obtained by further recrystallization from the same solvent mixture. It has the following properties: M.P. about 222–223° (dec.); $[\alpha]_D^{23} + 128°$ (c. 0.39 in chloroform);

$\lambda_{max.}^{alc.}$ 239 mµ ($\epsilon = 16,000$); $\lambda_{max.}^{Nujol}$ 2.97 µ (OH)

5.96µ, 6.18µ (20- and Δ⁴-3-keto).

*Analysis.*—Calcd. for $C_{21}H_{29}O_3Br$ (409.44): C, 61.62; H, 7.14. Found: C, 61.99; H, 7.06.

In place of N-bromoacetamide, an equal weight of dibromodimethylhydantoin can be used.

12α-bromo-11β-hydroxyprogesterone possesses about ¼ the activity of cortisone acetate in the rat liver glycogen test.

EXAMPLE 2

*11β,12β-epoxyprogesterone*

A solution of 480 mg. of 12α-bromo-11β-hydroxyprogesterone and 2.41 grams of anhydrous potassium acetate in 48 ml. of absolute alcohol is refluxed for one hour. Water is added and the alcohol evaporated in vacuo. The resulting suspension is extracted with chloroform and the chloroform extract washed with dilute sodium bicarbonate and with water. After drying over sodium sulfate, the solvent is removed in vacuo and the residual 11β,12β-epoxyprogesterone crystallized from acetone-hexane. The pure substance has the following properties: M.P. about 169–170°; $[\alpha]_D^{23} + 204°$ (c. 0.81 in $CHCl_3$);

$\lambda_{max.}^{alc.}$ 238 mµ ($\epsilon = 16,300$); $\lambda_{max.}^{Nujol}$ 5.90 µ (20-keto)

6.01µ, 6.21µ (Δ⁴-3-keto).

*Analysis.*—Calcd. for $C_{21}H_{28}O_3$ (328.44): C, 76.79; H, 8.59. Found: C, 76.70; H, 8.74

EXAMPLE 3

*12α-chloro-11β-hydroxyprogesterone*

To a solution of 30 mg. of 11β,12β-epoxyprogesterone in 5 ml. of pure dioxane is added at room temperature 1.25 ml. of 2.5 N-hydrochloric acid. The mixture was allowed to remain at room temperature for 1 hour after which time chloroform is added and the resulting layers are separated. The chloroform-dioxane solution is extracted with dilute bicarbonate and with water, and after drying over sodium sulfate, the solvents are removed in vacuo. The resulting residue is crystallized from acetone-hexane and after one recrystallization furnishes pure 12α-chloro-11β-hydroxyprogesterone of the following properties: M.P. about 233–234°;

$[\alpha]_D^{23} + 162°$ (c. 0.60 in CHCl$_3$);

$\lambda_{max.}^{alc.}$ 239 mμ (ε = 17,000); $\lambda_{max.}^{Nujol}$ 2.98 μ (OH)

5.97μ, 6.17μ (20-keto and Δ$^4$-3-keto).

Analysis.—Calcd. for C$_{21}$H$_{29}$O$_3$Cl (364.90): C, 69.12; H, 8.01. Found: C, 69.26; H, 7.97

12α-chloro-11β-hydroxyprogesterone possesses about ½ the activity of cortisone acetate in the rat liver glycogen assay.

EXAMPLE 4

*12α-chloro-11-ketoprogesterone*

To a solution of 10 mg. of 12α-chloro-11β-hydroxyprogesterone in 1 ml. of glacial acetic acid is added a solution of 3.5 mg. of chromium trioxide in 1 ml. of glacial acetic acid. Ten minutes later the chromium trioxide is destroyed by the addition of ¼ ml. of ethanol and the solution concentrated to a syrup in vacuo. The residue is taken up in chloroform and extracted with water, dilute sodium bicarbonate and again with water. After drying over sodium sulfate the chloroform is evaporated in vacuo and the semi-crystalline residue chomatographed on 200 mg. of sulfuric acid-washed alumina. Elution of the column with a mixture containing 25% benzene and 75% hexane furnishes crystalline material which on recrystallization from 95% ethanol melts at about 170–173°;

$\lambda_{max.}^{alc.}$ 236 mμ (ε = 17,000)

12α-chloro-11-ketoprogesterone possesses about ½ the activity of cortisone acetate in the rat liver glycogen assay.

EXAMPLE 5

*12α-fluoro-11β-hydroxyprogesterone*

To a solution of 100 mg. of 11β,12β-epoxyprogesterone in 19 ml. of chloroform and 1 ml. of absolute alcohol is added at 0°, with the exclusion of moisture, hydrogen fluoride until the solution assumed a permanent raspberry-red color. After stirring for 1.5 hours at 0°, the mixture is neutralized with a suspension of sodium bicarbonate. The chloroform layer is washed with water, dried over sodium sulfate and the solvent removed in vacuo.

The residue crystallizes readily from acetone-hexane and yields pure 12α-fluoro-11β-hydroxyprogesterone having the following properties: M.P. about 182–183°; $[\alpha]_D^{23} + 193°$ (c. 0.47 in CHCl$_3$);

$\lambda_{max.}^{alc.}$ 239 mμ (ε = 18,000); $\lambda_{max.}^{Nujol}$ 3.00 μ (OH)

5.89μ (20-keto); 6.05μ, 6.20μ(Δ$^4$-3-keto).

Analysis.—Calcd. for C$_{21}$H$_{29}$O$_3$F (348.44): C, 72.29; H, 8.39; F, 5.45. Found: C, 72.41; H, 8.32; F, 5.49.

From the acetone-hexane water liquor is isolated a small amount of a second substance, which after recrystallization for acetone-hexane melts at about 215–216° C.;

$\lambda_{max.}^{alc.}$ 236 mμ (ε = 17,000); $\lambda_{max.}^{Nujol}$ 2.93 μ (OH)

5.87μ (20-keto), 6.05μ, 6.19μ (Δ$^4$-3-keto).

EXAMPLE 6

*12α-fluoro-11-ketoprogesterone*

To a solution of 7 mg. of 12α-fluoro-11β-hydroxyprogesterone in 2 ml. of glacial acetic acid is added a solution of 2.4 mg. of CrO$_3$ in 1 ml. of acetic acid. After 25 minutes excess chromic acid is destroyed by the addition of 0.5 ml. of alcohol and the mixture distributed between water and chloroform. The chloroform layer is washed with water, sodium bicarbonate and water, and after evaporation of the chloroform in vacuo, the resulting residue is crystallized from acetone-hexane. Pure 12α-fluoro-11-ketoprogesterone has the following properties: M.P. about 147–148° C.; $[\alpha]_D^{23} + 271°$ (c. 0.35 in CHCl$_3$);

$\lambda_{max.}^{alc.}$ 236 mμ (ε = 16,500); $\lambda_{max.}^{Nujol}$ 5.81 μ (11-keto)

5.86μ (20-keto), 6.00μ, 6.20μ (Δ$^4$-3-keto).

12α-fluoro-11β-hydroxy- and 11-ketoprogesterone possess activity about equal to that of cortisone acetate in the rat liver glycogen assay.

The invention may be otherwise variously embodied within the scope of the appended claims.

We claim:
1. 12α-fluoro-11β-hydroxyprogesterone.
2. 12α-fluoro-11-ketoprogesterone.
3. 12α-chloro-11β-hydroxyprogesterone.

References Cited in the file of this patent

UNITED STATES PATENTS

| | | |
|---|---|---|
| 2,403,683 | Reichstein | July 9, 1946 |
| 2,683,712 | Hogg | July 13, 1954 |
| 2,686,181 | Julian | Aug. 10, 1954 |
| 2,732,383 | Bernstein | Jan. 24, 1956 |
| 2,735,856 | Hogg | Feb. 21, 1956 |
| 2,782,211 | Wettstein | Feb. 19, 1957 |
| 2,790,814 | Hogg et al. | Apr. 30, 1957 |